US012804178B2

(12) United States Patent
Kidani

(10) Patent No.: US 12,804,178 B2
(45) Date of Patent: Nov. 17, 2026

(54) IMAGE DECODING WITH OVERLAPPED BLOCK MOTION COMPENSATION AND GEOMETRIC PARTITIONING MODE

(71) Applicant: KDDI CORPORATION, Tokyo (JP)

(72) Inventor: Yoshitaka Kidani, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 19 days.

(21) Appl. No.: 18/441,323

(22) Filed: Feb. 14, 2024

(65) Prior Publication Data

US 2024/0187625 A1 Jun. 6, 2024

Related U.S. Application Data

(63) Continuation of application No. PCT/JP2022/029750, filed on Aug. 3, 2022.

(30) Foreign Application Priority Data

Aug. 18, 2021 (JP) ................................ 2021-133666

(51) Int. Cl.
*H04N 19/44* (2014.01)
*H04N 19/176* (2014.01)
*H04N 19/583* (2014.01)

(52) U.S. Cl.
CPC .......... *H04N 19/44* (2014.11); *H04N 19/176* (2014.11); *H04N 19/583* (2014.11)

(58) Field of Classification Search
CPC .... H04N 19/44; H04N 19/176; H04N 19/583; H04N 19/119; H04N 19/136; H04N 19/159; H04N 19/105; H04N 19/513; H04N 19/61
See application file for complete search history.

(56) References Cited

U.S. PATENT DOCUMENTS

| | | | | |
|---|---|---|---|---|
| 2020/0154128 | A1* | 5/2020 | Lee ...................... | H04N 19/513 |
| 2021/0250581 | A1 | 8/2021 | Xu et al. | |
| 2022/0239902 | A1* | 7/2022 | Wang ................... | H04N 19/105 |
| 2022/0321890 | A1* | 10/2022 | Lim ..................... | H04N 19/137 |

OTHER PUBLICATIONS

International Search Report (ISR) (and an English language translation thereof) dated Oct. 18, 2022, issued in International Application No. PCT/JP2022/029750.
Written Opinion dated Oct. 18, 2022, issued in International Application No. PCT/JP2022/029750.
"ITU-T H.266 Versatile Video Coding", Series H: Audiovisual and Multimedia Systems; Infrastructure of audiovisual services—Coding of moving video, Annex C, pp. 456-476, Aug. 2020.
(Continued)

*Primary Examiner* — Richard T Torrente
(74) *Attorney, Agent, or Firm* — Holtz, Holtz & Volek PC

(57) ABSTRACT

An image decoding device includes a circuit, wherein the circuit applies overlapped block motion compensation to a sub-block facing a block boundary of a block to be decoded to which a geometric partitioning mode including inter prediction or intra prediction is applied.

16 Claims, 18 Drawing Sheets

(56) References Cited

OTHER PUBLICATIONS

Blaser, et al., "Description of SDR and 360° video coding technology proposal by RWTH Aachen University", Joint Video Experts Team (JVET) of ITU-T SG 16 WP 3 and ISO/IEC JTC 1/SC 29/WG 11. JVET-J0023-v1, 10th Meeting: San Diego. US. Apr. 2018. pp. 1-14, 28 and 29.
Chang, et al., "Compression efficiency methods beyond VVC", Joint Video Experts Team (JVET) of ITU-T SG 16 WP 3 and ISO/IEC JTC 1/SC 29. JVET-U0100. 21st Meeting, by teleconference. Jan. 2021. pp. 1-27.
Kidani, et al., "AHG12: GPM with inter and intra prediction", Joint Video Experts Team (JVET) of ITU-T SG 16 WP 3 and ISO/IEC JTC 1/SC 29. JVET-W0110-v2. 23rd Meeting, by teleconference. Jul. 2021. pp. 1-3.
Kidani, et al., "EE2-related: Combination of JVET-X0078 (Test 7/8), JVET-X0147 (Proposal-2), and GPM direct motion storage", Joint Video Experts Team (JVET) of ITU-T SG 16 WP 3 and ISO/IEC JTC 1/SC 29, JVET-X0166-v3, 24th Meeting, by teleconference. Oct. 2021. pp. 1-5.
Kidani, et al., "EE2-related: Modified GPM with inter and intra prediction", Joint Video Experts Team (JVET) of ITU-T SG 16 WP 3 and ISO/IEC JTC 1/SC 29. JVET-X0078-v2, 24th Meeting, by teleconference. Oct. 2021. pp. 1-6.

* cited by examiner

FIG. 8

Table 1 – Specification of angleIdx and distanceIdx based on merge_gpm_partition_idx

| | | | | | | | | | | | | | | | | |
|---|---|---|---|---|---|---|---|---|---|---|---|---|---|---|---|---|
| merge_gpm_partition_idx | 0 | 1 | 2 | 3 | 4 | 5 | 6 | 7 | 8 | 9 | 10 | 11 | 12 | 13 | 14 | 15 |
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| merge_gpm_partition_idx | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |
| merge_gpm_partition_idx | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

FIG. 9

Table 1 – Specification of the geometric partitioning distance array disLut

| idx | 0 | 2 | 3 | 4 | 5 | 6 | 8 | 10 | 11 | 12 | 13 | 14 |
|---|---|---|---|---|---|---|---|---|---|---|---|---|
| disLut[ idx ] | 8 | 8 | 8 | 4 | 4 | 2 | 0 | −2 | −4 | −4 | −8 | −8 |
| idx | 16 | 18 | 19 | 20 | 21 | 22 | 24 | 26 | 27 | 28 | 29 | 30 |
| disLut[ idx ] | −8 | −8 | −8 | −4 | −4 | −2 | 0 | 2 | 4 | 4 | 8 | 8 |

IMAGE DECODING WITH OVERLAPPED BLOCK MOTION COMPENSATION AND GEOMETRIC PARTITIONING MODE

CROSS-REFERENCE TO RELATED APPLICATIONS

The present application is a continuation of PCT Application No. PCT/JP2022/029750, filed on Aug. 3, 2022, which claims the benefit of Japanese patent application No. 2021-133666 filed on Aug. 18, 2021, the entire contents of which are incorporated herein by reference in its entirety.

TECHNICAL FIELD

The present invention relates to an image decoding device, an image decoding method, and a program.

BACKGROUND ART

Non Patent Literature 1 discloses a geometric partitioning mode (GPM).

The GPM diagonally divides a rectangular block into two and performs motion compensation on each of the two blocks. Specifically, in the GPM, each of the two partitioned areas are motion-compensated by a motion vector in a merge mode, and are blended by weighted averaging. As the oblique partitioning pattern, sixty-four patterns are prepared according to the angle and the displacement.

Non-Patent Literature 2 discloses an overlapped block motion compensation (OBMC).

When a prediction block to be motion-compensated is adjacent to a target block to be motion-compensated by a motion vector different from that of the target block, the OBMC enlarges a reference area of an adjacent block by a predetermined area crossing a block boundary with the target block, and performs a weighted average of the reference area of the target block and the enlarged reference area of the adjacent block.

CITATION LIST

Non Patent Literature 1: ITU-T H.266/VVC

Non Patent Reference 2: JVET-W0024, "EE2: Summary Report on Enhanced Compression beyond VVC capability"

SUMMARY OF THE INVENTION

Furthermore, Non-Patent Literature 2 discloses an OBMC, but does not define a method of applying the OBMC to a GPM, and there is a problem that there is room for performance improvement if the OBMC can be appropriately applied to the GPM including intra prediction.

Therefore, the present invention has been made in view of the above-described problems, and an object of the present invention is to provide an image decoding device, an image decoding method, and a program that can be expected to improve prediction accuracy by defining a method of applying the OBMC to the GPM.

A first feature of the present invention is summarized as an image decoding device including a circuit, wherein the circuit applies overlapped block motion compensation to a sub-block facing a block boundary of a block to be decoded to which a geometric partitioning mode including inter prediction or intra prediction is applied.

A second feature of the present invention is summarized as an image decoding device including a circuit, wherein the circuit: applies overlapped block motion compensation to a sub-block of which a prediction type is inter prediction among sub-blocks facing a block boundary of a block to be decoded to which a geometric partitioning mode including the inter prediction or intra prediction is applied; doesn't apply the overlapped block motion compensation to the sub-block of which the prediction type is the intra prediction among the sub-blocks facing the block boundary; and generates a final predicted sample of the block to be decoded by performing weighted average on the motion compensation sample to which the overlapped block motion compensation has been applied and the intra predicted sample to which the overlapped block motion compensation has not been applied.

A third feature of the present invention is summarized as an image decoding device including a circuit, wherein the circuit executes: a first process that generates motion compensation samples configuring a block to be decoded to which a geometric partitioning mode including inter prediction or intra prediction is applied; and a second process that generates an intra predicted sample configuring the block to be decoded and output the intra predicted sample to the inter prediction unit, the first process: blends predicted samples of the block to be decoded by performing weighted average on the generated motion compensation samples or the intra predicted samples output from the second process; and applies overlapping block motion compensation to a sub-block facing a block boundary of the block to be decoded.

A fourth feature of the present invention is summarized as an image decoding device including a circuit, wherein the circuit executes: a first process that generates motion compensation samples configuring a block to be decoded to which a geometric partitioning mode including inter prediction or intra prediction is applied; and a second process that generates an intra predicted sample configuring the block to be decoded and output the intra predicted sample to the inter prediction unit, the first process: determines whether to apply overlapped block motion compensation to a sub-block facing a block boundary of the block to be decoded; and blends a predicted samples of the block to be decoded by performing weighted average on the intra predicted samples output from the second process with respect to the motion compensation samples.

A fifth feature of the present invention is summarized as an image decoding method, including applying overlapped block motion compensation to a sub-block facing a block boundary of a block to be decoded to which a geometric partitioning mode including inter prediction or intra prediction is applied.

A sixth feature of the present invention is summarized as a program stored on a non-transitory computer-readable medium for causing a computer to function as an image decoding device, wherein the image decoding device includes a circuit, and the circuit applies overlapped block motion compensation to a sub-block facing a block boundary of a block to be decoded to which a geometric partitioning mode including inter prediction or intra prediction is applied.

According to the present invention, it is possible to provide an image decoding device, an image decoding method, and a program that can be expected to improve prediction accuracy by defining a method of applying the OBMC to the GPM.

BRIEF DESCRIPTION OF THE DRAWINGS

FIG. 8 is a diagram illustrating an example of angleIdx that defines an angle of a partition line of the GPM.

FIG. 9 is a diagram illustrating an example of disLut.

DESCRIPTION OF EMBODIMENTS

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

First Embodiment

Figure 1:
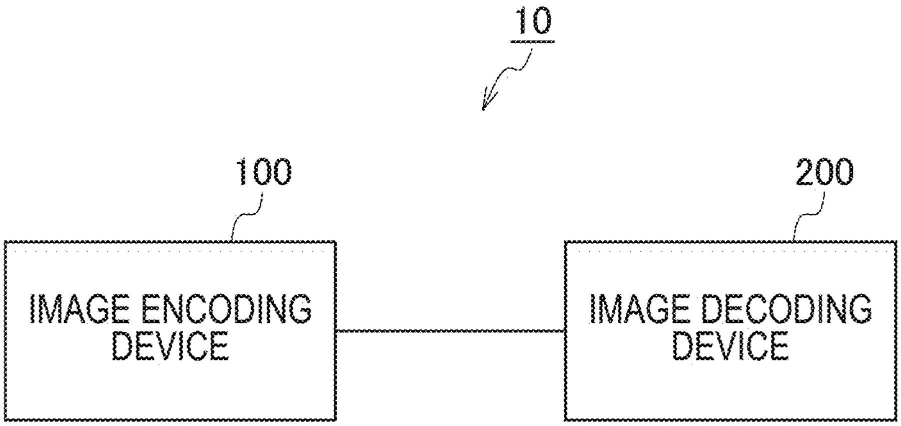
FIG. 1 is a diagram illustrating an example of a configuration of an image processing system 1 according to an embodiment.

Hereinafter, an image processing system 10 according to a first embodiment of the present invention will be described with reference to FIGS. 1 to 15. FIG. 1 is a diagram illustrating the image processing system 10 according to the present embodiment.

(Image Processing System 10)

As illustrated in FIG. 1, the image processing system 10 according to the present embodiment includes an image encoding device 100 and an image decoding device 200.

The image encoding device 100 is configured to generate coded data by coding an input image signal (picture). The image decoding device 200 is configured to generate an output image signal by decoding the coded data.

The coded data may be transmitted from the image encoding device 100 to the image decoding device 200 via a transmission path. The coded data may be stored in a storage medium and then provided from the image encoding device 100 to the image decoding device 200.

(Image Encoding Device 100)

Figure 2:
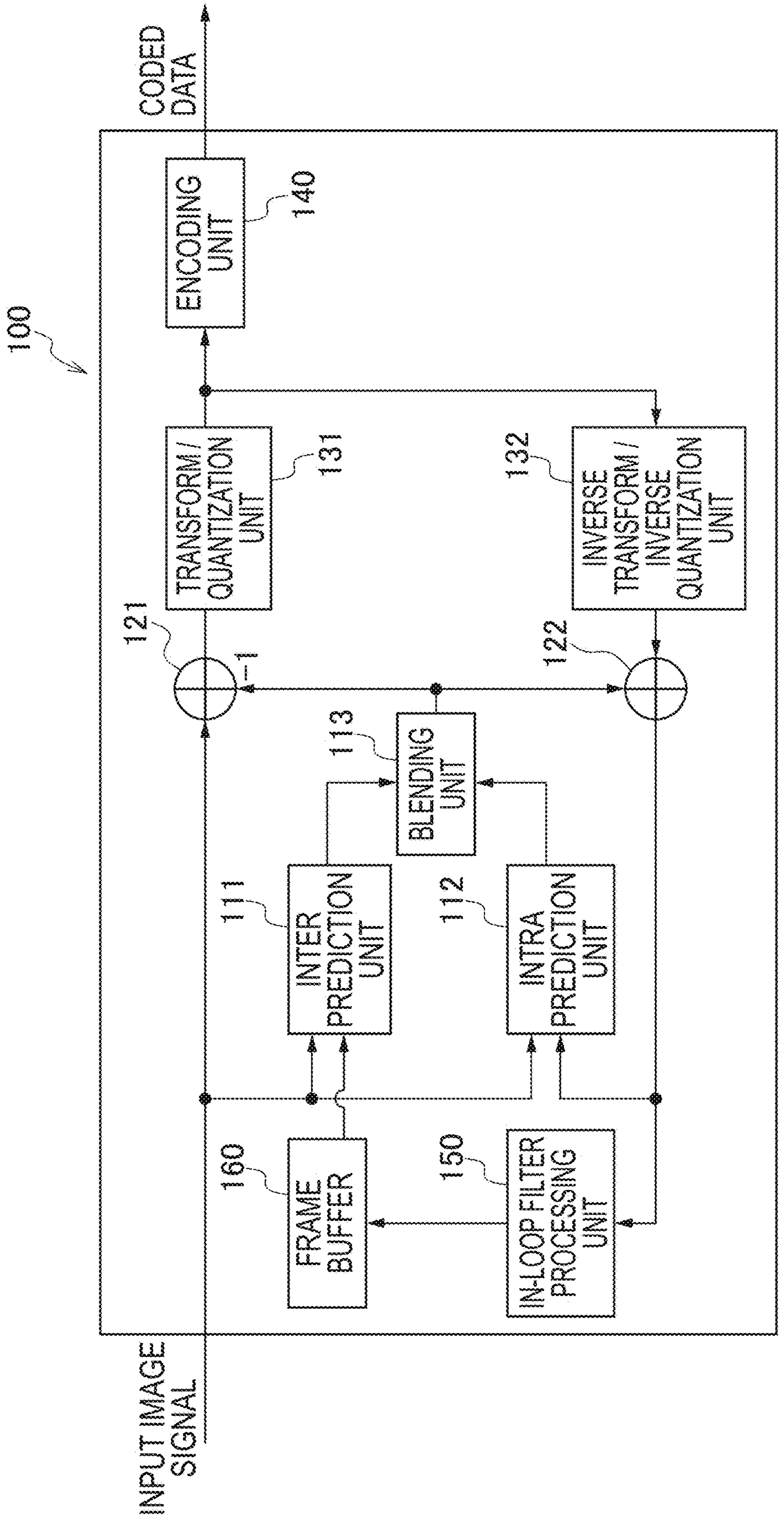
FIG. 2 is a diagram illustrating an example of functional blocks of an image encoding device 100 according to an embodiment.

Hereinafter, the image encoding device 100 according to the present embodiment will be described with reference to FIG. 2. FIG. 2 is a diagram illustrating an example of functional blocks of the image encoding device 100 according to the present embodiment.

As shown in FIG. 2, the image encoding device 100 includes an inter prediction unit 111, an intra prediction unit 112, a blending unit 113, a subtractor 121, an adder 122, a transform/quantization unit 131, an inverse transform/inverse quantization unit 132, an encoding unit 140, an in-loop filtering processing unit 150, and a frame buffer 160.

The inter prediction unit 111 is configured to generate a prediction signal by inter prediction (inter-frame prediction).

Specifically, the inter prediction unit 111 is configured to specify a reference block included in a reference frame by comparing a frame to be coded (hereinafter, referred to as a target frame) with the reference frame stored in the frame buffer 160, and determine a motion vector (mv) for the specified reference block. Here, the reference frame is a frame different from the target frame.

The inter prediction unit 111 is configured to generate the prediction signal included in a block to be coded (hereinafter, referred to as a target block) for each target block based on the reference block and the motion vector.

The inter prediction unit 111 is configured to output the inter prediction signal to the blending unit 113.

Although not illustrated in FIG. 2, the inter prediction unit 111 is configured to output information related to inter prediction control (specifically, information such as an inter prediction mode, a motion vector, a reference frame list, and a reference frame number) to the encoding unit 140.

The intra prediction unit 112 is configured to generate a prediction signal by intra prediction (intra-frame prediction).

Specifically, the intra prediction unit 112 is configured to specify the reference block included in the target frame, and generate the prediction signal for each target block based on the specified reference block. Here, the reference block is a block referred to for the target block. For example, the reference block is a block adjacent to the target block.

Furthermore, the intra prediction unit 112 is configured to output the intra prediction signal to the blending unit 113.

Furthermore, although not illustrated in FIG. 2, the intra prediction unit 112 is configured to output information (specifically, information such as an intra prediction mode) regarding control of intra prediction to the encoding unit 140.

The blending unit 113 is configured to blend the inter prediction signal input from the inter prediction unit 111 and/or the intra prediction signal input from the intra prediction unit 112 using a preset weighting factor, and output the blended prediction signal (hereinafter, collectively referred to as a prediction signal) to the subtractor 121 and the adder 122.

Here, regarding the blending processing of the inter prediction signal and/or the intra prediction signal by the blending unit 113, the same configuration as that of Non Patent Literature 1 can be adopted in the present embodiment, and thus the description thereof will be omitted.

The subtractor 121 is configured to subtract the prediction signal from the input image signal, and output a prediction residual signal to the transform/quantization unit 131. Here, the subtractor 121 is configured to generate the prediction residual signal that is a difference between the prediction signal generated by intra prediction or inter prediction and the input image signal.

The adder 122 is configured to add the prediction signal output from the blending unit 113 to the prediction residual signal output from the inverse transform/inverse quantization unit 132 to generate a decoded signal before filtering, and output the decoded signal before filtering to the intra prediction unit 112 and the in-loop filter processing unit 150.

Here, the pre-filtering decoded signal constitutes the reference block used by the intra prediction unit 112.

The transform/quantization unit 131 is configured to perform transform processing for the prediction residual signal and acquire a coefficient level value. Furthermore, the transform/quantization unit 131 may be configured to perform quantization of the coefficient level value.

Here, the transform processing is processing of transforming the prediction residual signal into a frequency component signal. In such transform processing, a kernel pattern (transformation matrix) corresponding to discrete cosine transform (Hereinafter referred to as DCT) may be used, or a kernel pattern (transformation matrix) corresponding to discrete sine transform (Hereinafter referred to as DST) may be used.

Furthermore, as the transform processing, multiple transform selection (MTS) that enables selection of a transform basis suitable for deviation of the coefficient of the prediction residual signal from the plurality of transform bases disclosed in Non Patent Literature 1 for each of the horizontal and vertical directions, or low frequency-non-separable transform (LFNST) that improves the coding performance by further concentrating the transform coefficient after the primary transform in the low frequency region may be used.

The inverse transform/inverse quantization unit 132 is configured to perform inverse transform processing for the coefficient level value output from the transform/quantization unit 131. Here, the inverse transform/inverse quantization unit 132 may be configured to perform inverse quantization of the coefficient level value prior to the inverse transform processing.

Here, the inverse transform processing and the inverse quantization are performed in a reverse procedure to the transform processing and the quantization performed by the transform/quantization unit 131.

The encoding unit 140 is configured to code the coefficient level value output from the transform/quantization unit 131 and output coded data.

Here, for example, the coding is entropy coding in which codes of different lengths are assigned based on a probability of occurrence of the coefficient level value.

Furthermore, the encoding unit 140 is configured to code control data used in decoding processing in addition to the coefficient level value.

Here, the control data may include size data such as a coding block (coding unit (CU)) size, a prediction block (prediction unit (PU)) size, and a transform block (transform unit (TU)) size.

Furthermore, the control data may include information (flag and index) necessary for control of the inverse transformation/inverse quantization processing of the inverse transform/inverse quantization unit 220, the inter prediction signal generation processing of the inter prediction unit 241, the intra prediction signal generation processing of the intra prediction unit 242, the blending processing of the inter prediction signal or/and the intra prediction signal of the blending unit 243, the filter processing of the in-loop filter processing unit 250, and the like in the image decoding device 200 described later.

Note that, in Non Patent Literature 1, these pieces of control data are referred to as syntaxes, and the definition thereof is referred to as semantics.

Furthermore, the control data may include header information such as a sequence parameter set (SPS), a picture parameter set (PPS), and a slice header as described later.

The in-loop filtering processing unit 150 is configured to execute filtering processing on the pre-filtering decoded signal output from the adder 122 and output the filtered decoded signal to the frame buffer 160.

Herein, for example, the filter processing is deblocking filter processing, which reduces the distortion generated at boundary parts of blocks (coding blocks, prediction blocks, or transform blocks), or adaptive loop filter processing, which switches filters based on filter coefficients, filter selection information, local properties of picture patterns of an image, etc. transmitted from the image encoding device 100.

The frame buffer 160 is configured to accumulate the reference frames used by the inter prediction unit 111.

Here, the filtered decoded signal constitutes the reference frame used by the inter prediction unit 111.

(Image Decoding Device 200)

Figure 3:
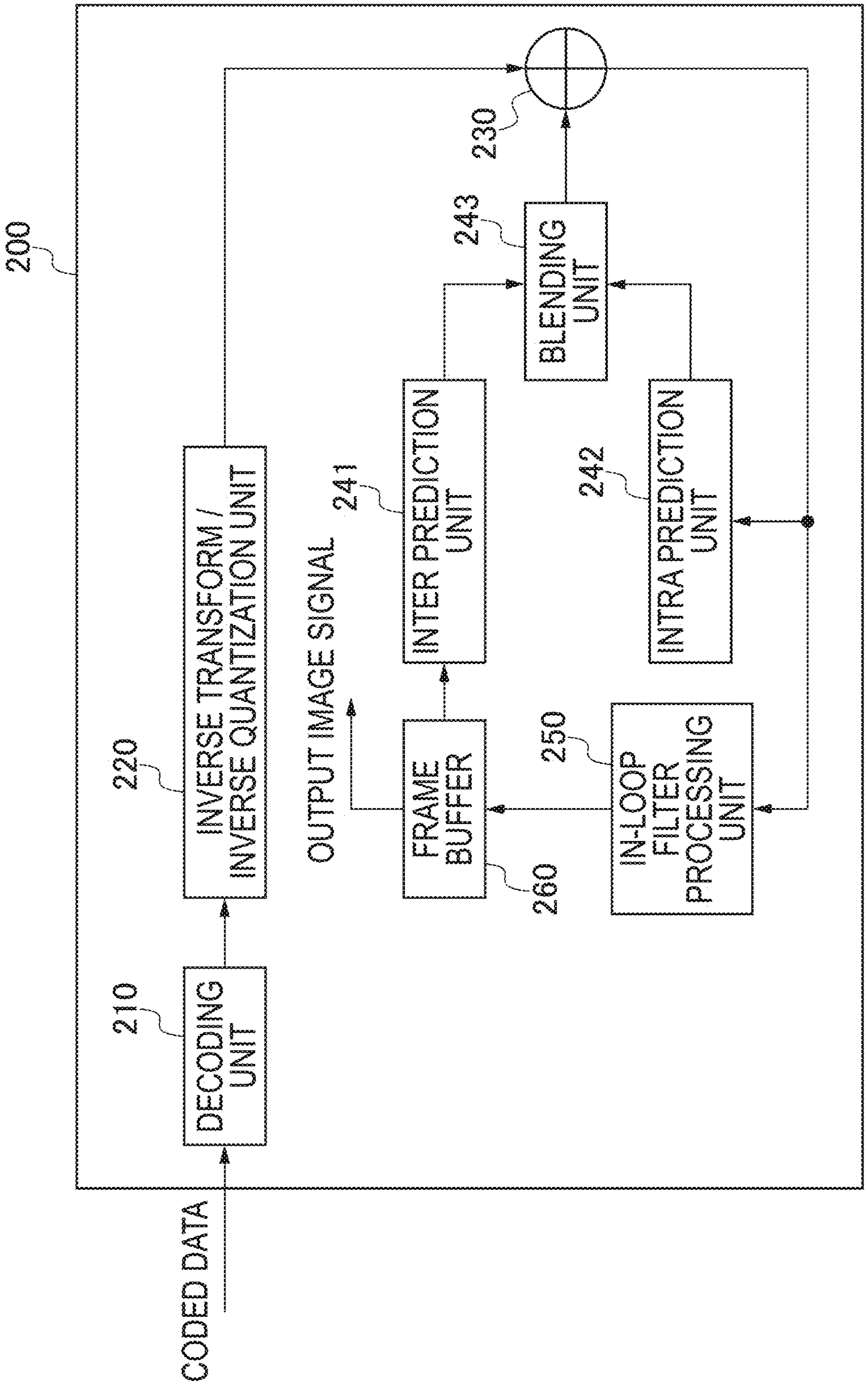
FIG. 3 is a diagram illustrating an example of functional blocks of an image decoding device 200 according to an embodiment.

Hereinafter, the image decoding device 200 according to the present embodiment will be described with reference to FIG. 3. FIG. 3 is a diagram illustrating an example of functional blocks of the image decoding device 200 according to the present embodiment.

As illustrated in FIG. 3, the image decoding device 200 includes a decoding unit 210, an inverse transform/inverse quantization unit 220, an adder 230, an inter prediction unit 241, an intra prediction unit 242, a blending unit 243, an in-loop filtering processing unit 250, and a frame buffer 260.

The decoding unit 210 is configured to decode the coded data generated by the image encoding device 100 and decode the coefficient level value.

Here, the decoding is, for example, entropy decoding performed in a reverse procedure to the entropy coding performed by the encoding unit 140.

Furthermore, the decoding unit 210 may be configured to acquire control data by decoding processing for the coded data.

Here, the control data may include information related to the block size of the decoded block (synonymous with a block to be encoded in the above-described image encoding device 100, hereinafter, collectively referred to as a target block) described above.

Furthermore, the control data may include information (flag or index) necessary for control of the inverse transformation/inverse quantization processing of the inverse transform/inverse quantization unit 220, the predicted sample generation processing of the inter prediction unit 241 or the intra prediction unit 242, the filter processing of the in-loop filter processing unit 250, and the like.

Furthermore, the control data may include header information such as a sequence parameter set (SPS), a picture parameter set (PPS), a picture header (PH), or a slice header (SH) described above.

The inverse transform/inverse quantization unit 220 is configured to perform inverse transform processing for the coefficient level value output from the decoding unit 210. Here, the inverse transform/inverse quantization unit 220 may be configured to perform inverse quantization of the coefficient level value prior to the inverse transform processing.

Here, the inverse transform processing and the inverse quantization are performed in a reverse procedure to the transform processing and the quantization performed by the transform/quantization unit 131.

Similarly to the inter prediction unit 111, the inter prediction unit 241 is configured to generate a prediction signal by inter prediction (inter-frame prediction).

Specifically, the inter prediction unit 241 is configured to generate the prediction signal for each prediction block based on the motion vector decoded from the coded data and the reference signal included in the reference frame. The inter prediction unit 241 is configured to output the prediction signal to the blending unit 243.

Similarly to the intra prediction unit 112, the intra prediction unit 242 is configured to generate a prediction signal by intra prediction (intra-frame prediction).

Specifically, the intra prediction unit 242 is configured to specify the reference block included in the target frame, and generate the prediction signal for each prediction block based on the specified reference block. The intra prediction unit 242 is configured to output the prediction signal to the blending unit 243.

Like the blending unit 113, the blending unit 243 is configured to blend the inter prediction signal input from the inter prediction unit 111 and/or the intra prediction signal input from the intra prediction unit 112 using a preset weighting factor, and output the blended prediction signal (hereinafter, collectively referred to as a prediction signal) to the adder 122.

The adder 230 is configured to add the prediction signal output from the blending unit 243 to the prediction residual signal output from the inverse transform/inverse quantization unit 220 to generate a pre-filtering decoded signal, and output the pre-filtering decoded signal to the intra prediction unit 242 and the in-loop filtering processing unit 250.

Here, the pre-filtering decoded signal constitutes a reference block used by the intra prediction unit 242.

Similarly to the in-loop filtering processing unit 150, the in-loop filtering processing unit 250 is configured to execute filtering processing on the pre-filtering decoded signal output from the adder 230 and output the filtered decoded signal to the frame buffer 260.

Herein, for example, the filter processing is deblocking filter processing, which reduces the distortion generated at boundary parts of blocks (coding blocks, prediction blocks, transform blocks, or sub-blocks obtained by dividing them), or adaptive loop filter processing, which switches filters based on filter coefficients, filter selection information, local properties of picture patterns of an image, etc. transmitted from the image encoding device 100.

Similarly to the frame buffer 160, the frame buffer 260 is configured to accumulate the reference frames used by the inter prediction unit 241.

Here, the filtered decoded signal constitutes the reference frame used by the inter prediction unit 241.

(Geometric Partitioning Mode)

Hereinafter, a first method and a second method for applying the intra prediction mode to the geometric partitioning mode (GPM) and the geometric partitioning mode (GPM) disclosed in Non-Patent Literature 1 related to the decoding unit 210, the inter prediction unit 241, and the intra prediction unit 242 will be described with reference to FIGS. 4 to 6.

Figure 4:
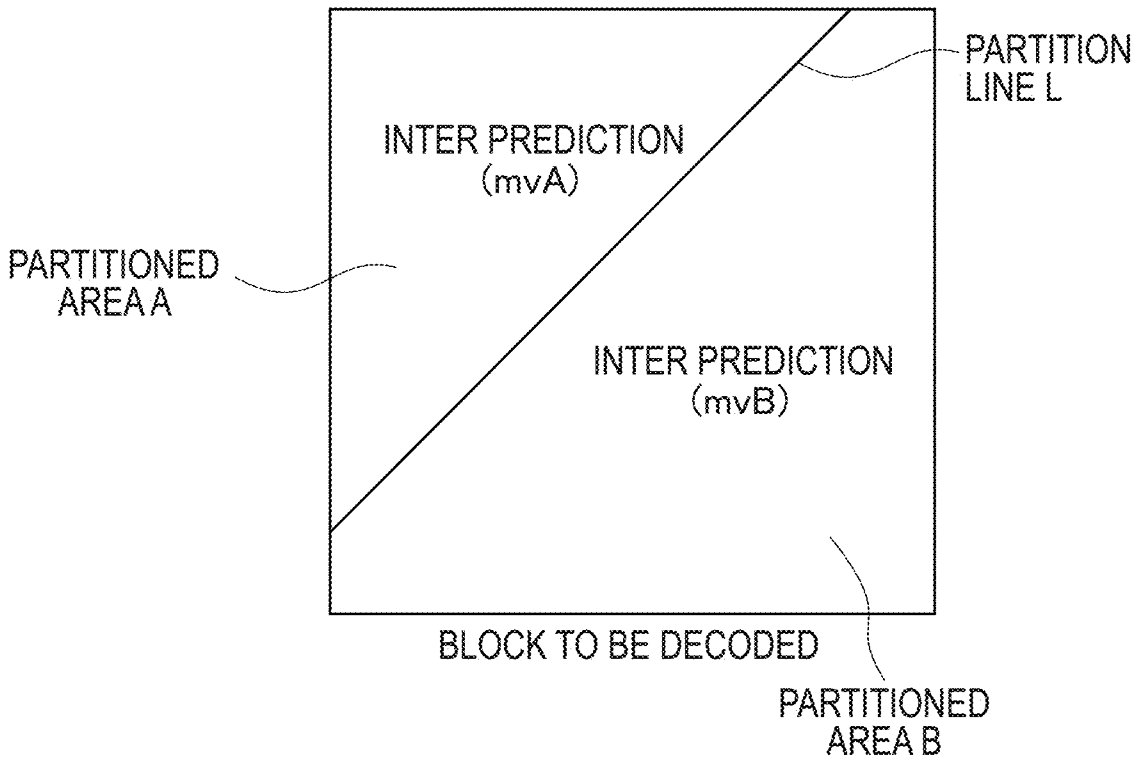
FIG. 4 is a diagram illustrating an example of a case where a rectangular block to be decoded is partitioned into two areas of a partitioned area A and a partitioned area B of a geometric shape by a partition line of a geometric partitioning mode according to the geometric partitioning mode disclosed in Non-Patent Literature 1.

FIG. 4 illustrates an example of a case where a rectangular block to be decoded is partitioned into two regions of partitioned area A and partitioned area B of a geometric shape by a partitioning line L1 of the geometric partitioning mode according to the geometric partitioning mode disclosed in Non Patent Literature 1.

Here, sixty-four patterns of the partitioning line L1 of the geometric partitioning mode disclosed in Non Patent Literature 1 are prepared according to the angle and the displacement.

Furthermore, the GPM according to Non Patent Literature 1 applies a normal merge mode, which is a type of inter prediction, to each of the partitioned area A and the partitioned area B to generate an inter predicted (motion-compensated) sample.

Specifically, in such a GPM, a merge candidate list disclosed in Non-Patent Literature 1 is built, a motion vector (mvA, mvB) and a reference frame of each partitioned area A/B are derived on the basis of the merge candidate list and two merge indexes (merge_gpm_idx0, merge_gpm_idx1) for each partitioned area A/B transmitted from the image encoding device 100, and a reference block, that is, an inter prediction (or motion compensation) block is generated. Finally, the inter prediction samples of each partitioned area A/B are weighted and averaged by a preset weight and blended.

Figure 5:
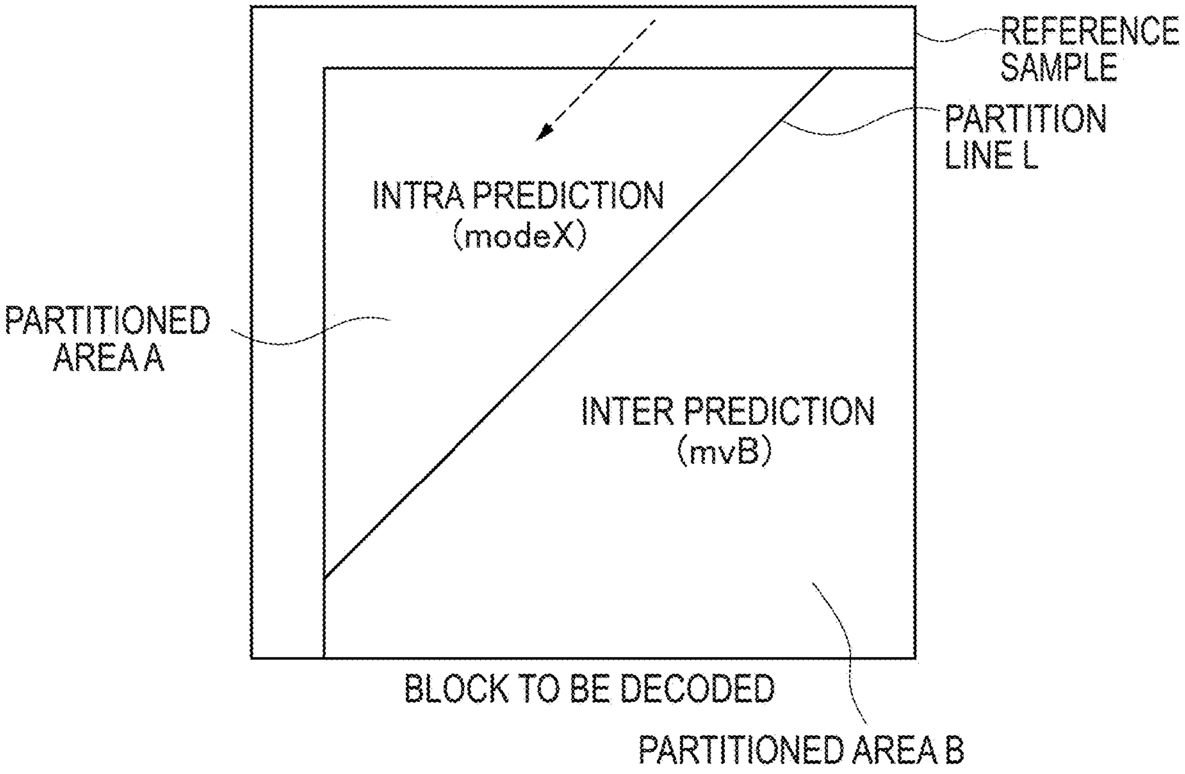
FIG. 5 illustrates an example of a method of applying an intra prediction mode to a GPM according to the present embodiment.
Figure 6:
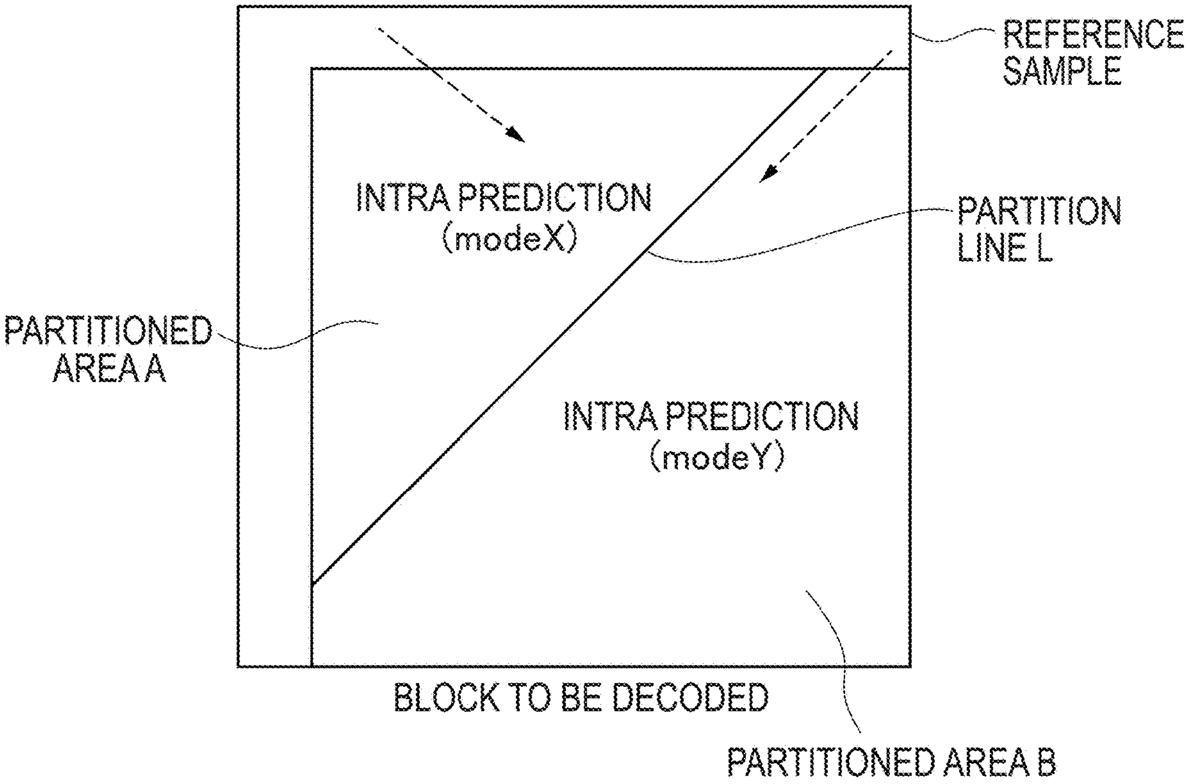
FIG. 6 illustrates an example of a method of applying an intra prediction mode to the GPM according to the present embodiment.

FIGS. 5 and 6 illustrate an example of a method of applying the intra prediction mode to the GPM.

Specifically, FIG. 5 illustrates a configuration example of the GPM in a case where the intra prediction (modeX) and the inter prediction are applied to each partitioned area A/B. FIG. 6 illustrates a configuration example of the GPM in a case where two different intra predictions (modeX, modeY) are applied to A/B of each partitioned area.

Here, in the GPM of the case illustrated in FIG. 5, either the normal merge mode or the intra prediction mode can be applied to each partitioned area A/B, and the type of the intra prediction mode is limited according to the partition shape (partition line) of the target block.

Furthermore, in the GPM illustrated in FIGS. 5 and 6, a method of specifying the application possibility of the GPM to which the intra prediction mode is additionally applied in the block to be decoded and the prediction mode type in each of the partitioned areas A/B when the GPM is applied is defined.

Consequently, the GPM to which the intra prediction mode is additionally applied is appropriately applied to the block to be decoded, and the optimum prediction mode is specified, as a result of which the coding performance can be further improved.

(GPM Weighting Factor)

Figure 7:
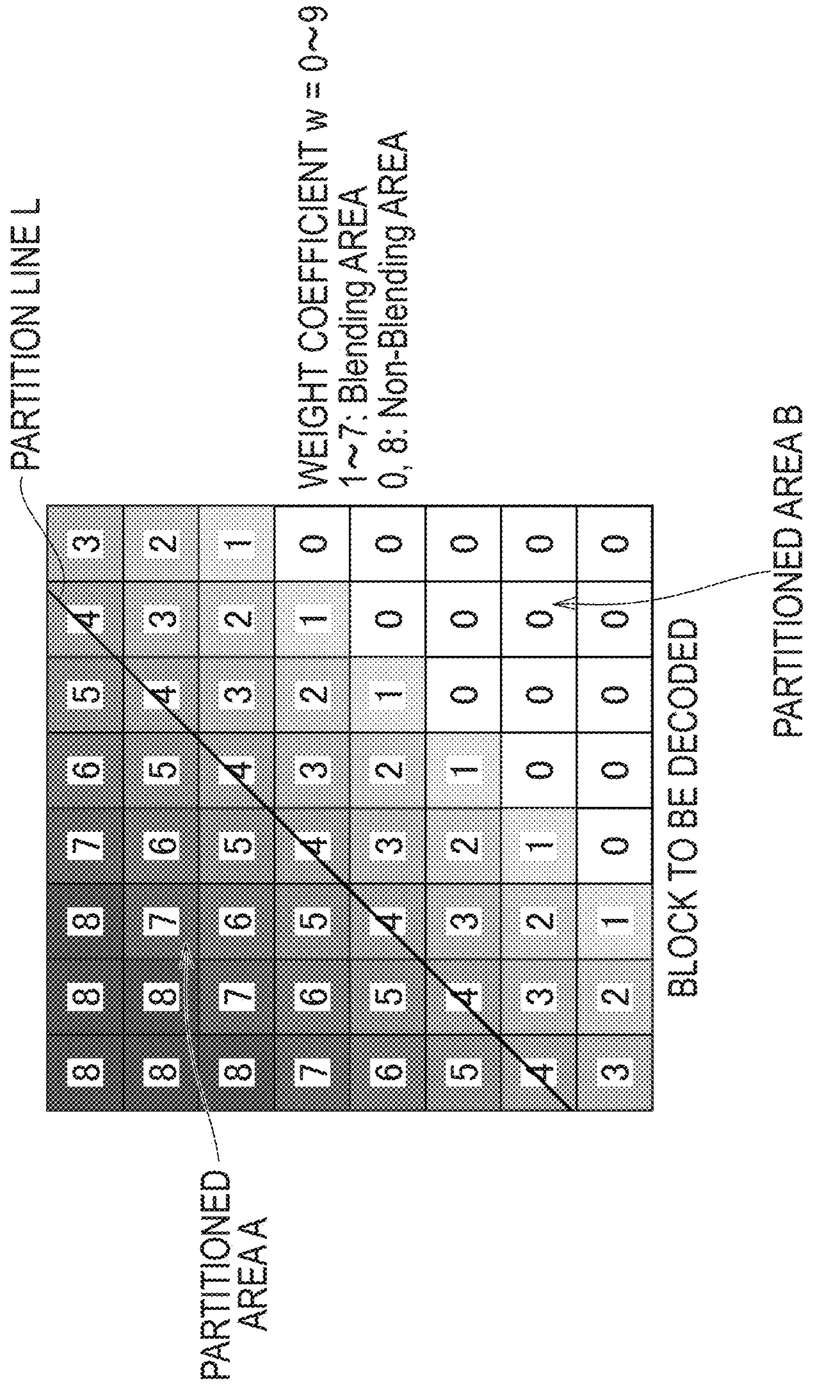
FIG. 7 is a diagram illustrating an example of a value of a weighting coefficient w for a predicted sample of each partitioned area A/B of the GPM.

Hereinafter, the weighting coefficient w of the GPM according to the decoding unit 210, the inter prediction unit 241, the intra prediction unit 242, and the blending unit 243 will be described with reference to FIG. 7. FIG. 7 is a diagram illustrating an example of a value of a weighting coefficient w for a predicted sample in each partitioned area A/B of the GPM.

The predicted samples of the respective partitioned areas A/B generated by the inter prediction unit 241 or the intra prediction unit 242 are blended (weighted average) by the weight coefficient w in the blending unit 243.

In Non-Patent Literature 1, a value of 0 to 8 is used as the value of the weighting coefficient w, and such a value of the weighting coefficient w may also be used in the present embodiment. Here, the values 0 and 8 of the weighting coefficient w indicate a non-blending area (non-blending area), and the values 1 to 7 of the weighting coefficient w indicate a blending area (blending).

Note that, in the present embodiment, the calculation method of the weighting coefficient w can be configured to be calculated as follows from the offset value (offsetX, offsetY) calculated from the sample position (xL, yL) and the target block size, the displacement (diplacementX, diplacementY) calculated from angleIdx that defines the angle of the partition line of the geometric partitioning mode (GPM) illustrated in FIG. 8, and the table value disLut calculated from diplacementX and diplacementY illustrated in FIG. 9, by a method similar to Non-Patent Literature 1.

$$\text{weightIdx}=(((xL+\text{offsetX})<<1)+1)\times\text{disLut}[\text{diplacementX}]+(((yL+\text{offsetY})<<1)+1)\times\text{disLut}[\text{diplacementY}]$$

$$\text{weightIdxL}=\text{partFlip}?32+\text{weight}Idx:32-\text{weightIdx}$$

$$w=\text{Clip3}(0,8,(\text{weightIdxL}+4)>>3)$$

(Overlapped Block Motion Compensation)

Hereinafter, overlapped block motion compensation (OBMC) disclosed in Non-Patent Literature 2 related to the decoding unit 210 and the inter prediction unit 241 will be described with reference to FIGS. 10 and 11.

Figure 10:
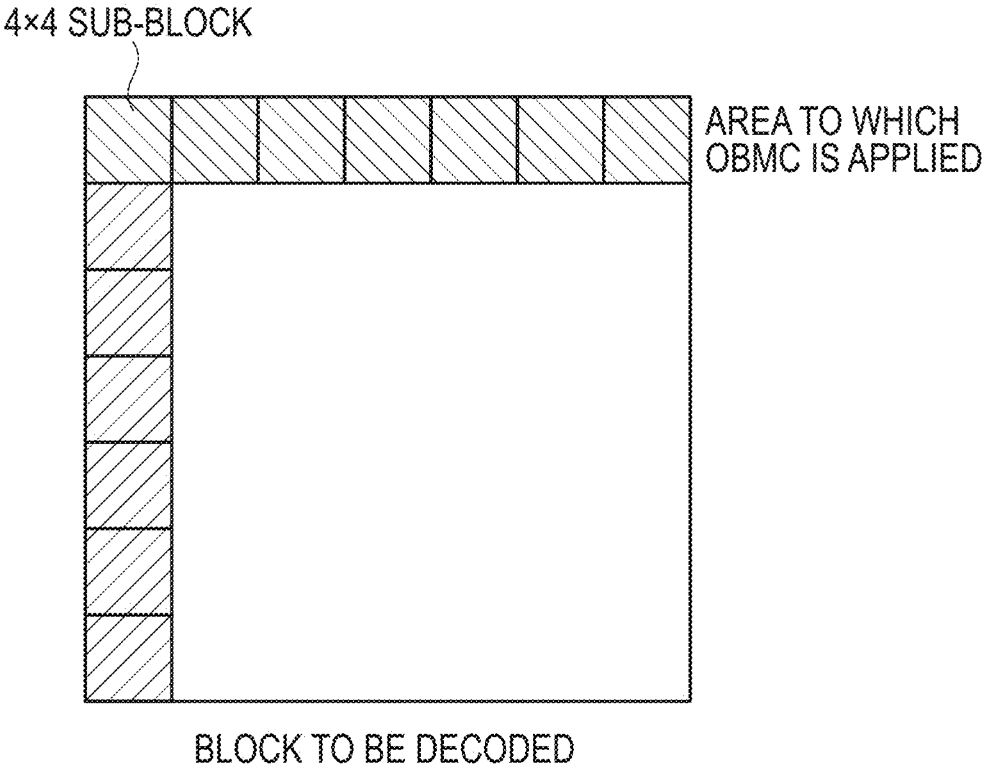
FIG. 10 is a diagram illustrating an example in which the OBMC is applied to block boundaries facing an upper side and a left side of a rectangular block to be decoded to be motion-compensated by the OBMC disclosed in Non-Patent Literature 2.

FIG. 10 illustrates an example in which the OBMC is applied to block boundaries facing the upper side and the left side of a rectangular block to be decoded that is subjected to motion compensation (MC) by the OBMC disclosed in Non-Patent Literature 2.

Here, the application area of the OBMC disclosed in Non-Patent Literature 2 is not only the upper and left block boundaries of the block to be decoded to be MC as illustrated in FIG. 10. Specifically, in a case of affine prediction or the like in which such a block to be decoded is partitioned into sub-blocks and MC is performed in units of the sub-blocks, the upper side, the left side, the right side, and the lower side of the sub-blocks are also application areas of the OBMC.

In addition, determination processing as to whether or not the OBMC disclosed in Non-Patent Literature 2 is applied and OBMC application processing in a case where the OBMC is applied are performed in units of sub-blocks (hereinafter, the target sub-block) of 4×4 samples as illustrated in FIG. 10.

Figure 11:
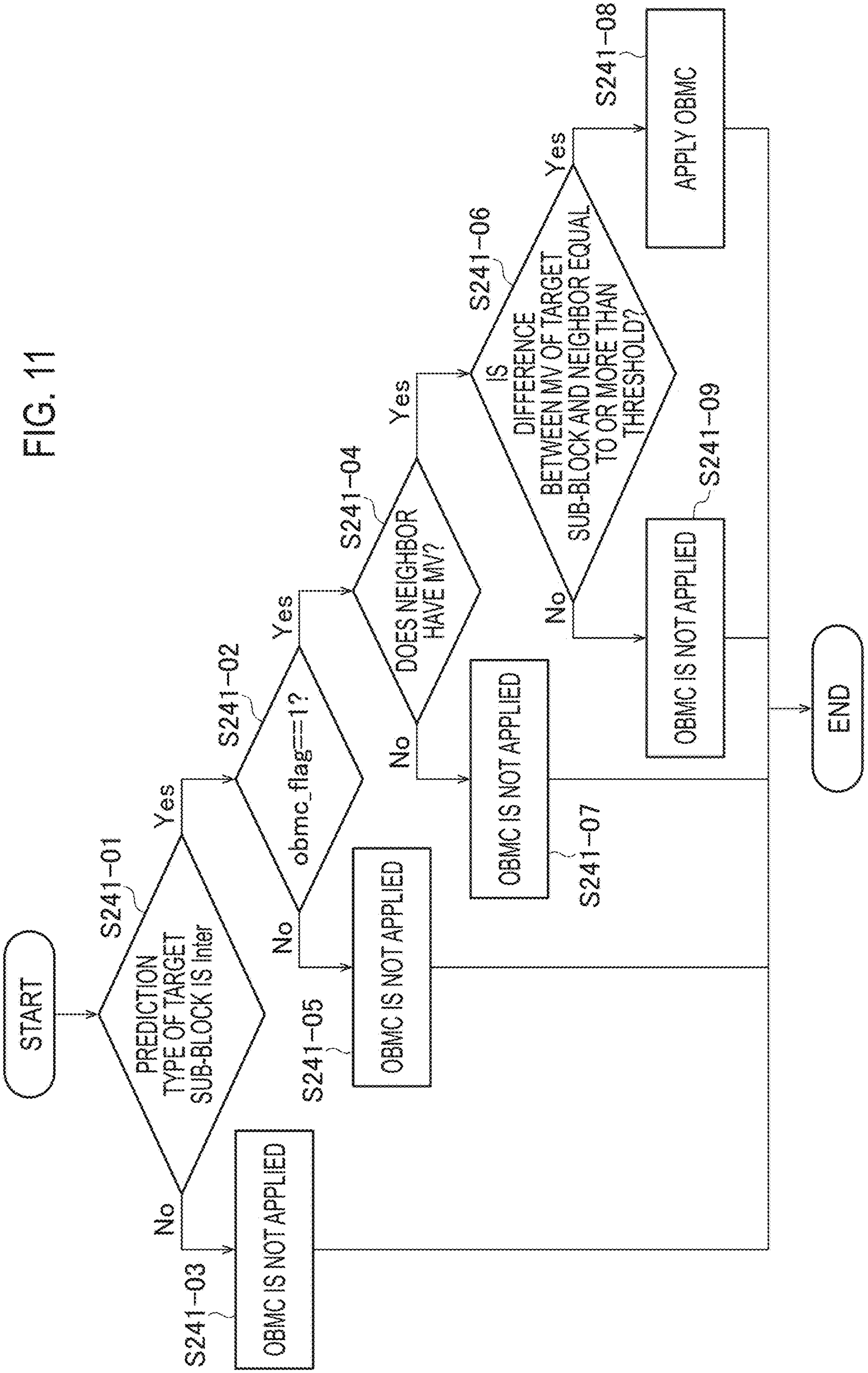
FIG. 11 is a flowchart illustrating an example of operation of an inter prediction unit 241.

In Non-Patent Literature 2, as illustrated in FIG. 11, the inter prediction unit 241 determines whether or not the OBMC is applied.

As illustrated in FIG. 11, in Step S241-01, the inter prediction unit 241 determines whether the prediction type of the target sub-block is the inter prediction (Inter prediction).

When it is determined that the condition is satisfied, the operation proceeds to Step S241-02, and when it is determined that the condition is not satisfied, that is, when it is determined that the prediction type of the target sub-block is the intra prediction (Intra prediction), the operation proceeds to Step S241-03.

In Step S241-03, the inter prediction unit 241 determines that the OBMC is not applied in the target sub-block, and this operation ends.

In Step S241-02, the inter prediction unit 241 determines whether obmc_flag of the target sub-block is 1.

When it is determined that such a condition is satisfied, the present operation proceeds to Step S241-04, and when it is determined that such a condition is not satisfied, that is, when obmc_flag is determined to be 1, the present operation proceeds to Step S241-05.

In Step S241-05, the inter prediction unit 241 determines that the OBMC is not applied in the target sub-block, and this operation ends.

Here, obmc_flag is syntax indicating that the OBMC is not applicable in units of blocks to be decoded. A value of obmc_flag of 0 indicates that the OBMC is not applied, and a value of obmc_flag of 1 indicates that the OBMC is applied.

As to whether the value of obmc_flag is 0 or 1, the decoding unit 210 decodes and specifies the value, or infers the value without decoding.

Since the obmc_flag decoding method, the obmc_flag value specifying method, and the obmc_flag estimation method can have the same configurations as those of Non-Patent Literature 2, detailed description thereof will be omitted.

In Step S241-04, the inter prediction unit 241 determines whether or not an adjacent block that crosses a block boundary with respect to the target sub-block has a motion vector (MV).

When it is determined that such a condition is satisfied, the present operation proceeds to Step S241-06, and when it is determined that such a condition is not satisfied, the present operation proceeds to Step S241-07.

In Step S241-07, the inter prediction unit 241 determines that the OBMC is not applied in the target sub-block, and this operation ends.

In Step S241-06, the inter prediction unit 241 determines whether a difference between the MV of the target sub-block and the MV of the adjacent block is equal to or larger than a predetermined threshold value.

When it is determined that such a condition is satisfied, the present operation proceeds to Step S241-08, and when it is determined that such a condition is not satisfied, the present operation proceeds to Step S241-09.

In Step S241-08, the inter prediction unit 241 determines that the OBMC is applied in the target sub-block, and this operation ends. On the other hand, in Step S241-09, the inter prediction unit 241 determines that the OBMC is not applied in the target sub-block, and this operation ends.

Here, a fixed value may be used as the predetermined threshold. For example, the predetermined threshold value may be one sample.

Alternatively, a variable value corresponding to the number of MVs included in the target sub-block may be used as the predetermined threshold. For example, when the target sub-block has one MV, the predetermined threshold may be set to one sample, and when the target sub-block has two MVs, the predetermined threshold may be set to 0.5 samples.

With the above configuration, in Non-Patent Literature 2, the discontinuity (hereinafter, block boundary distortion) of the block boundary between the target sub-block and the adjacent block is eliminated by applying the OBMC only when the difference in MV from the adjacent block is large with respect to the target sub-block having MV, as a result which, improvement in prediction performance can be expected.

(Application Example and Application Control Method of the OBMC to the GPM)

Figure 12:
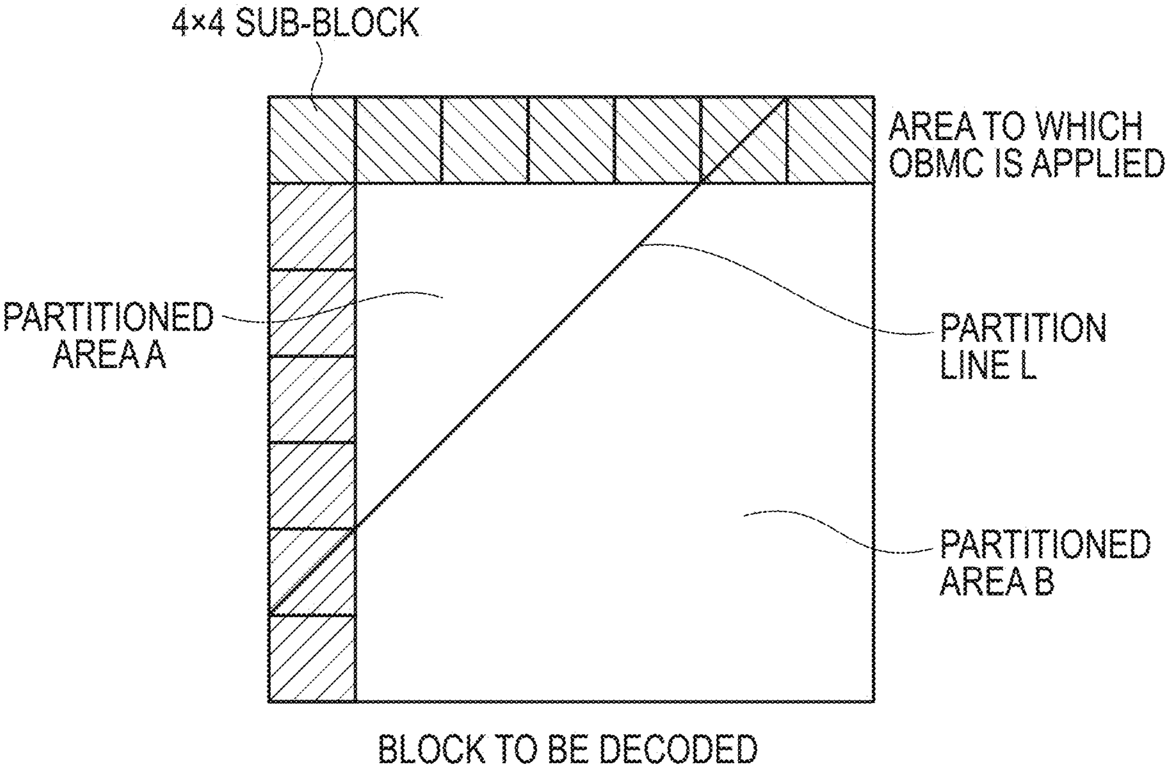
FIG. 12 illustrates an example of application of the OBMC to a block to which the GPM is applied in the present embodiment.

Hereinafter, an application example and an application control method of the OBMC for the GPM related to the decoding unit 210, the inter prediction unit 241, and the intra prediction unit 242 will be described with reference to FIG. 12.

FIG. 10 illustrates an application example of the OBMC to a block to which the GPM is applied in the present embodiment. As illustrated in FIG. 10, there are a maximum of three patterns in the target sub-block to which the OBMC is applied according to the partition shape (partition line L) of the GPM.

Specifically, a first pattern includes target sub-blocks belonging to the partitioned area A, a second pattern includes target sub-blocks belonging to the partitioned area B, and a third pattern includes target sub-blocks belonging to both the partitioned areas A/B.

The target sub-blocks of the three patterns are further partitioned depending on whether the prediction type applied to the partitioned area A and the partitioned area B is inter prediction or intra prediction.

Specifically, the target sub-blocks of the first pattern and the second pattern are partitioned into two cases of inter prediction and intra prediction.

On the other hand, the target sub-block of the third pattern is partitioned into a total of three cases of two different inter prediction cases, an inter prediction case and an intra prediction case, and two different intra prediction cases.

In the present embodiment, the target sub-block has only one prediction type. Therefore, in the target sub-block of the third pattern, the prediction type of the target sub-block is determined by a combination of two predictions configuring the target sub-block. Specifically, the prediction type including two different inter predictions is treated as the inter prediction, the prediction type including the inter prediction and the intra prediction is treated as the inter prediction, and the prediction type including two different intra predictions is treated as the intra prediction.

Here, it should be determined that the OBMC is not applicable to the target sub-block of which the prediction type is intra prediction among the target sub-blocks to which the OBMC is applied for the following reasons. This is because the predicted sample of the target sub-block under the same condition is generated by the intra prediction using a reference sample (reconstructed sample) adjacent to the target sub-block, and thus block boundary distortion is less likely to qualitatively occur at a block boundary between the reference sample and the generated predicted sample as in the inter prediction.

For the above reasons, in the present embodiment, the application of the OBMC is restricted to the target sub-block whose prediction type is the intra prediction among the target sub-blocks to which the OBMC is applied (OBMC is not applicable).

On the other hand, in the present embodiment, the OBMC is applicable to the target sub-block whose prediction type is the inter prediction among the target sub-blocks to which the OBMC is applied.

Hereinafter, a method of generating a final predicted sample in consideration of the applicability of the OBMC to the GPM according to the present embodiment will be described.

(Method for Generating Final Predicted Sample in Consideration of Applicability of OBMC to GPM)

Hereinafter, with reference to FIGS. 3 and 13 to 18, a method of generating a final predicted sample in consideration of the applicability of the OBMC to the GPM according to the inter prediction unit 241, the intra prediction unit 242, and the blending unit 243 of the present embodiment will be described.

[Method 1 (Configuration 1)]

Figure 13:
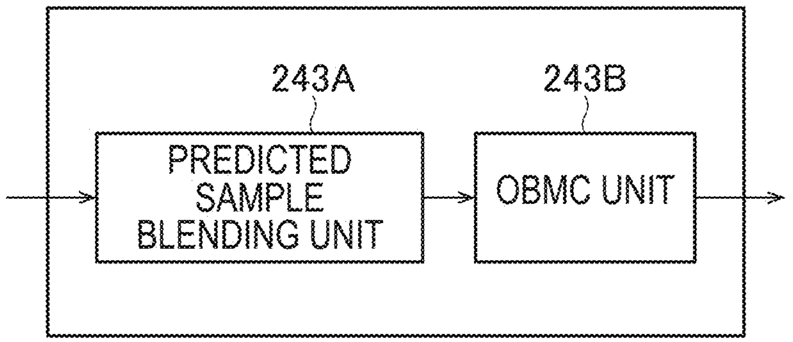
FIG. 13 is a diagram illustrating an example of functional blocks of a blending unit 243 according to a method 1 (configuration 1).

In a method 1 (configuration 1), as illustrated in FIG. 13, the blending unit 243 illustrated in FIG. 3 includes a predicted sample blending unit 243A and an OBMC unit 243B.

The predicted sample blending unit 243A is configured to blend the motion compensation samples (MC samples) output from the inter prediction unit 241 or the intra prediction unit 242 with the intra predicted samples, and then output the predicted samples to the OBMC unit 243B.

Furthermore, in a case where the block to be decoded is a GPM-applied block, the predicted sample blending unit 243A is configured to blend (weighted average) the predicted samples output from the inter prediction unit 241 or the intra prediction unit 242 by the weighting coefficient w described above.

The OBMC unit 243B is configured to determine whether the OBMC is applicable to the predicted sample of the block to be decoded output from the predicted sample blending unit 243A according to the OBMC application control method described above in units of sub-blocks facing the block boundary of the block to be decoded, and output a final predicted sample.

With the above configuration, the following two effects can be expected.

First, since the OBMC can be appropriately applied to the sub-block facing the block boundary of the block to be decoded to which the GPM is applied (specifically, OBMC is applicable to a sub-block whose prediction type is the inter prediction, and the OBMC is not applicable to a sub-block whose prediction type is intra prediction), as a result, improvement in prediction performance can be expected.

However, the present configuration example partially has the following problems. Specifically, even in the case of a sub-block whose prediction type is the inter prediction, in the case of a sub-block originally having two prediction types of inter prediction and intra prediction, it is better to blend the inter predicted sample and the intra prediction after application of the OBMC than to apply the OBMC after blending the inter predicted sample and the intra predicted sample. This is because, in the former case, the OBMC is also applied to the intra predicted sample in which the block boundary distortion is originally less likely to occur with the adjacent sample, but in the latter case, the OBMC is not applied. A method of generating a final predicted sample that solves this problem will be described later as a modification of the present configuration.

Secondly, since the OBMC can be applied to the predicted sample blended (weighted average) by the GPM by determining the applicability of the OBMC, it is possible to suppress an increase in the number of processing executions (processing stage) of the OBMC and the memory bandwidth necessary for the execution of the OBMC to the minimum necessary for the conventional GPM.

Specifically, since there is a case where the GPM-applied block includes up to two inter predictions, that is, two MVs, the worst value (maximum value) of the reference area in the GPM-applied block is the number of samples of the reference area indicated by the two MVs. On the other hand, when the OBMC is applied to the GPM-applied block, an additional reference area of the adjacent MVs is required. However, in the case of the present configuration, since the OBMC is applied to the predicted sample blended (weighted average) by the GPM, it is possible to avoid applying the OBMC to each of the maximum two inter predictions configuring the GPM-applied block, and it is possible to suppress an increase in the additional reference area by the OBMC to ½ with respect to the avoidance pattern. In the same way of thinking, the processing execution number (processing stage) of the OBMC can also be suppressed to ½ with respect to the avoidance pattern.

[Method 2 (Configuration 2)]

Figure 14:
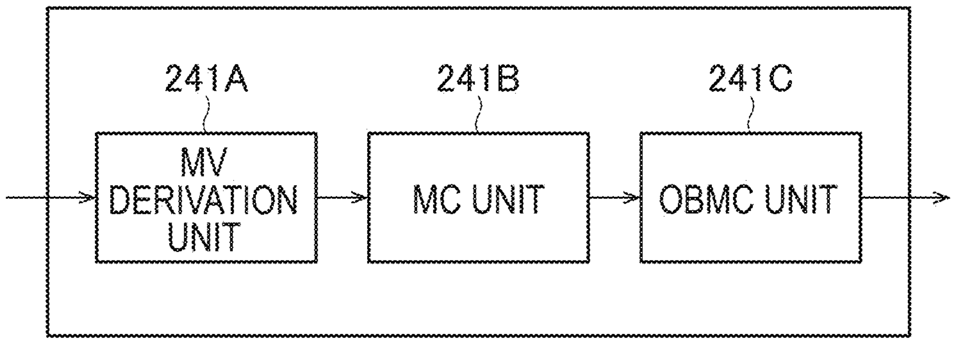
FIG. 14 is a diagram illustrating an example of functional blocks of the inter prediction unit 241 according to a method 2 (configuration 2).

FIG. 14 is a modification of the method (configuration) of generating the final predicted sample in consideration of the applicability of the OBMC to the GPM that can be realized in FIG. 13.

In a method 2 (configuration 2), as shown in FIG. 14, the inter prediction unit 241 includes an MV derivation unit 241A, an MC unit 241B, and an OBMC unit 241C.

The MV derivation unit 241A is configured to output the MV necessary for the inter prediction including the GPM to the MC unit 241B based on a reference frame output from the frame buffer unit and control data output from the decoding unit 210.

The MC unit 241B is configured to generate an MC sample on the basis of the MV output from the MV derivation unit 241A and the reference frame output from the frame buffer unit, and output the MC sample to the OBMC unit 241C.

The OBMC unit 241C is configured to determine whether the OBMC is applicable to the MC sample output from the MC unit 241B, and when the OBMC is applicable, generate a final motion compensation sample by applying the OBMC and output the final motion compensation sample to the blending unit 243 in a subsequent stage.

Note that the blending unit 243 in the subsequent stage of this configuration does not include the OBMC unit 243B described in method 1 (configuration 1), and is configured to blend the motion compensation samples or the intra predicted samples output from the inter prediction unit 241 or the intra prediction unit 242.

That is, with respect to the OBMC unit 243B described above, the OBMC unit 241C can determine that the OBMC is not applicable to only the sub-block of which the prediction type is the inter prediction.

With the present configuration illustrated in FIG. 14, improvement in prediction performance can be further expected with respect to the configuration 1 illustrated in FIG. 13, while a memory bandwidth required for the OBMC and the number of processing executions of the OBMC increase.

Specifically, since the OBMC can be directly executed for only the inter predicted samples before generation of the final predicted sample of the GPM by the blending unit 243, even if the above-described prediction type is the inter prediction, the OBMC can be not applied to the intra predicted samples of the sub-block originally having two prediction types of the inter prediction and the intra prediction. As a result, it is possible to avoid unnecessary application of the OBMC to the intra-predicted sample in which a block boundary distortion is originally less likely to occur with an adjacent sample, and as a result, prediction performance is improved.

On the other hand, since the OBMC is directly executed only for the inter predicted sample before the generation of the final predicted sample of the GPM by the blending unit 243, a memory bandwidth required for the OBMC and the number of executed processes of the OBMC are doubled as compared with the configuration 1 described above.

[Method 3 (Configuration 3)]

A method 3 (configuration 3), which is a modification of the method (method 1) of generating the final predicted sample in consideration of the applicability of the OBMC to the GPM that can be realized in FIGS. 2, 3, and 13 or the method (method 2) of generating the final predicted sample in consideration of the applicability of the OBMC to the GPM that can be realized in FIGS. 2, 3, and 14, will be described with reference to FIGS. 15 to 17.

Figure 15:
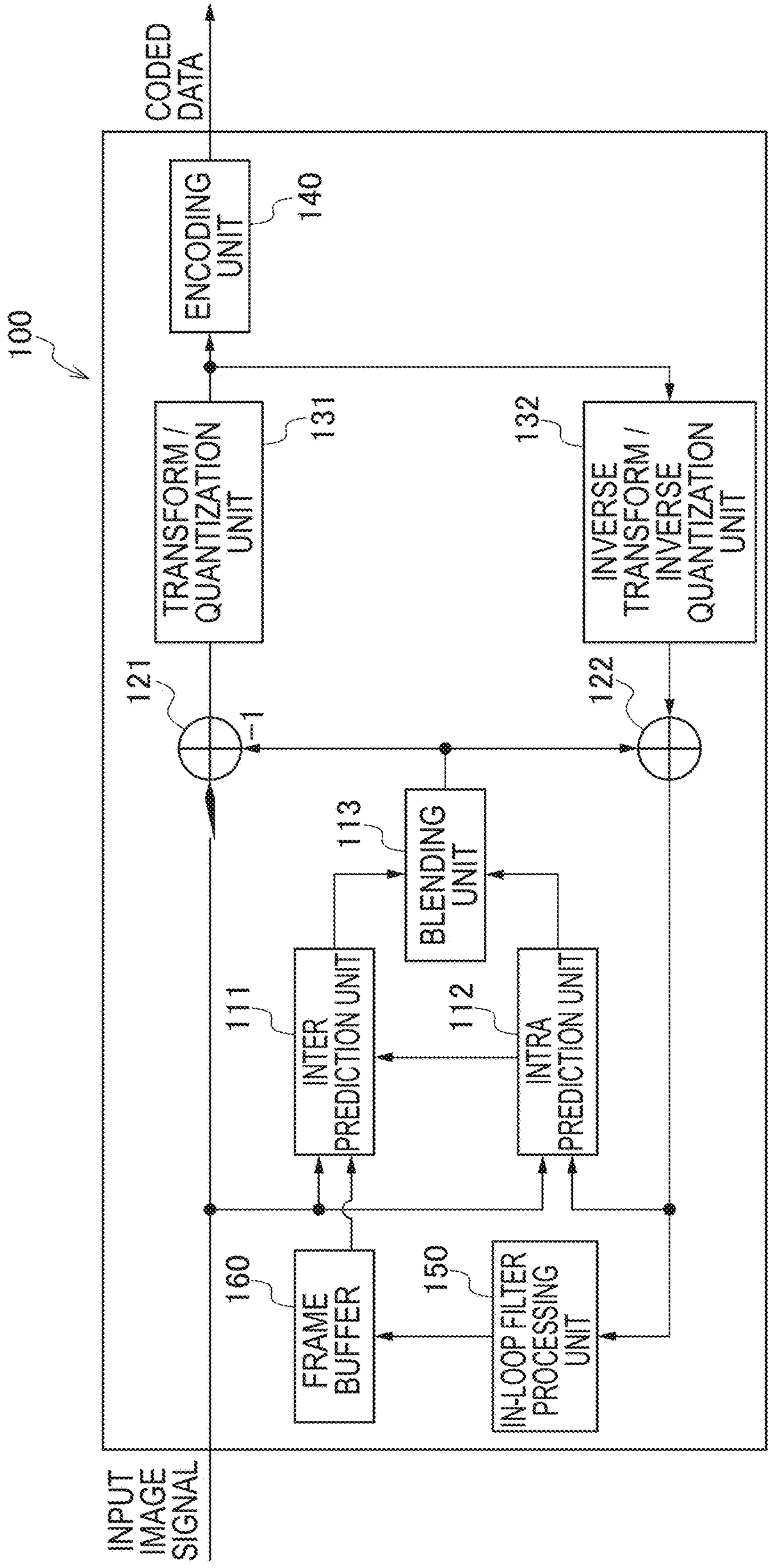
FIG. 15 is a diagram illustrating an example of functional blocks of an image encoding device 100 according to a method 3 (configuration 3) or a method 4 (configuration 4).

In the method 3 (configuration 3), as illustrated in FIG. 15, a line through which the intra prediction unit 112 outputs an intra predicted sample to the inter prediction unit 111 is added to FIG. 2. As a result, as will be described later, the inter prediction unit 111 can generate a final predicted sample weighted and averaged by the GPM. That is, the blending unit 113 in method 1 (configuration 1) or the method 2 (configuration 2) described above can be made unnecessary.

Figure 16:
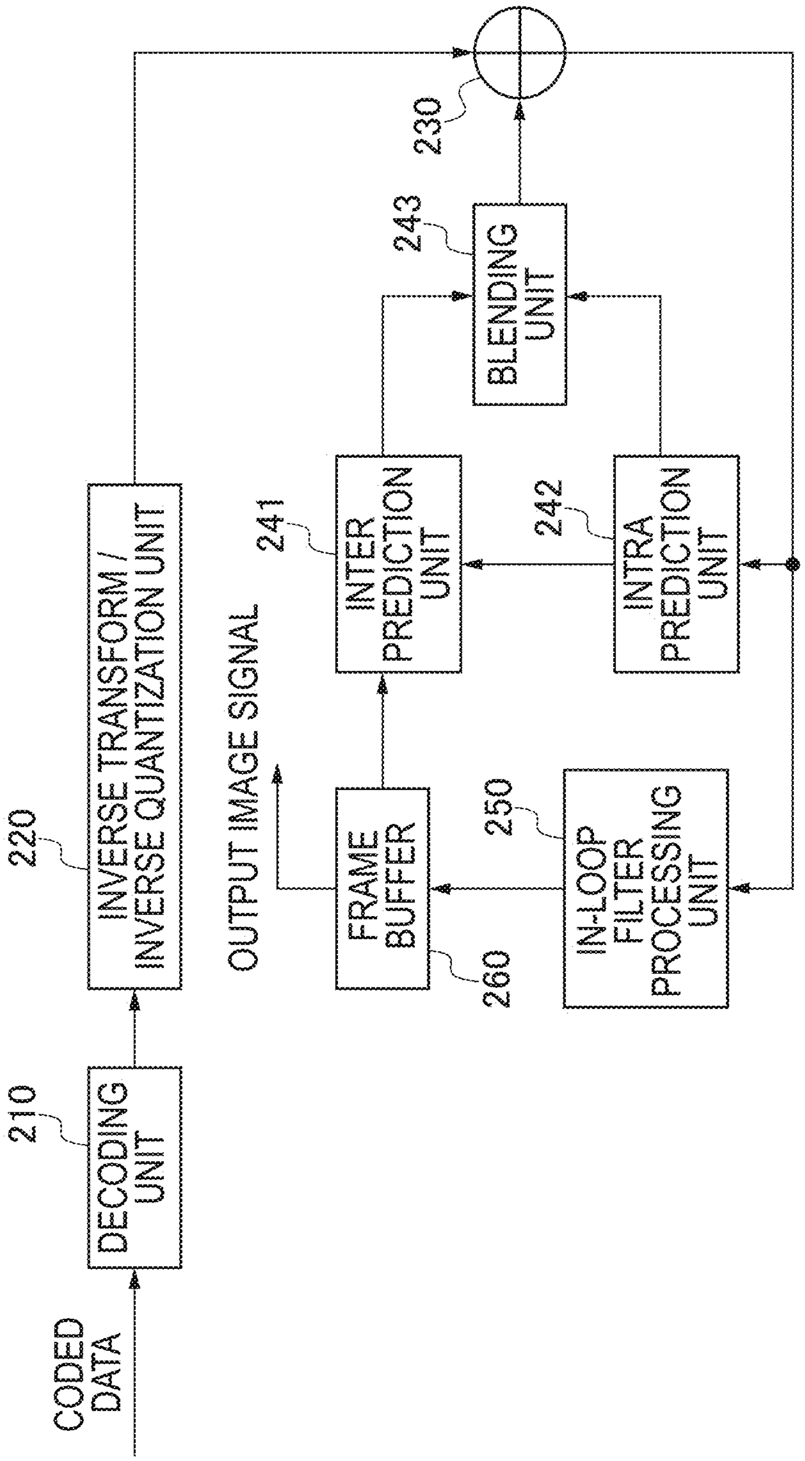
FIG. 16 is a diagram illustrating an example of functional blocks of an image decoding device 200 according to a method 3 (configuration 3) or a method 4 (configuration 4).

Further, in the method 3 (configuration 3), as illustrated in FIG. 16, a line through which the intra prediction unit 242 outputs the intra predicted sample to the inter prediction unit 241 is added to FIG. 3. As a result, as will be described later, the inter prediction unit 241 can generate a final predicted sample weighted and averaged by the GPM. That is, the blending unit 243 in the method 1 (configuration 1) or method 2 (configuration 2) described above can be made unnecessary.

Figure 17:
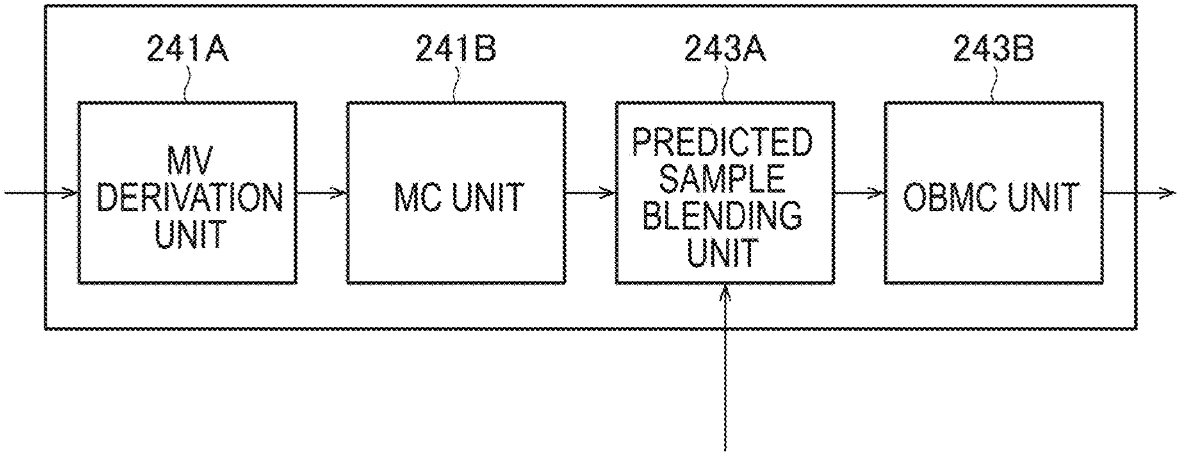
FIG. 17 is a diagram illustrating an example of functional blocks of the blending unit 243 according to a method 3 (configuration 3).

In the Method 3 (Configuration 3), as shown in FIG. 17, the inter prediction unit 241 (111) includes an MV derivation unit 241A, an MC unit 241B, a predicted sample blending unit 243A, and an OBMC unit 241C.

Here, the MV derivation unit 241A and the MC unit 241B can have the same configuration as the MV derivation unit 241A and the MC unit 241B illustrated in FIG. 14.

Furthermore, the predicted sample blending unit 243A and the OBMC unit 243B can have the same configuration as the predicted sample blending unit 243A and the OBMC unit 243B of the blending unit 243 illustrated in FIG. 13.

The effects expected from the above configuration are the same as those of the configuration 1.

[Method 4 (Configuration 4)]

A method 4 (configuration 4) will be described with reference to FIGS. 15, 16, and 18, the method 4 being a modification of the method (method 1) of generating the final predicted sample in consideration of the applicability of the OBMC to the GPM that can be realized in FIGS. 2, 3, and 13 or the method (method 2) of generating the final predicted sample in consideration of the applicability of the OBMC to the GPM that can be realized in FIGS. 2, 3, and 14. Hereinafter, only differences from the previously described configuration will be described.

Figure 18:
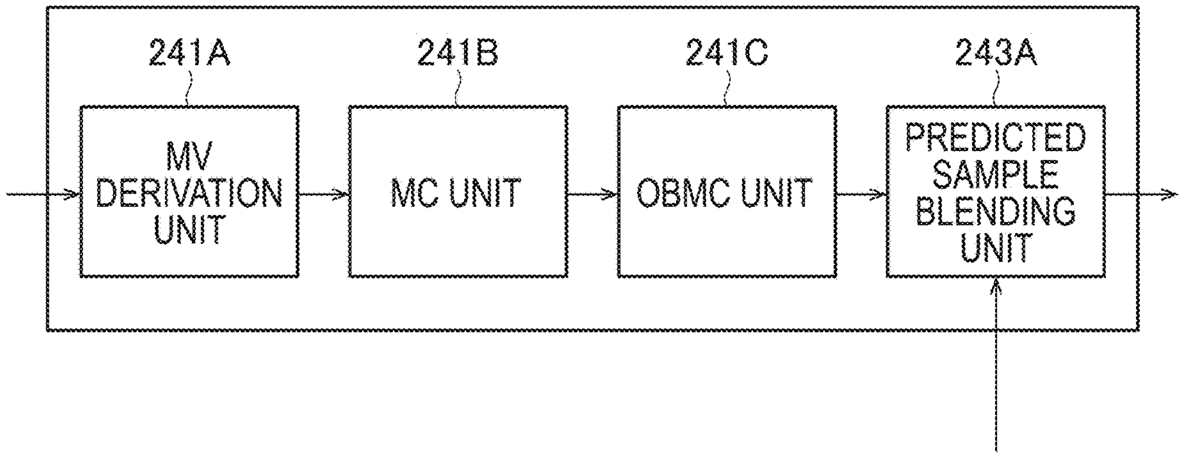
FIG. 18 is a diagram illustrating an example of functional blocks of the inter prediction unit 241 according to a method 4 (configuration 4).

In the method 4 (configuration 4), as shown in FIG. 18, the inter prediction unit 241 (111) includes an MV derivation unit 241A, an MC unit 241B, an OBMC unit 241C, and a predicted sample blending unit 243A.

Here, the MV derivation unit 241A, the MC unit 241B, and the OBMC unit 241C can have the same configuration as the MV derivation unit 241A, the MC unit 241B, and the OBMC unit 241C illustrated in FIG. 14.

Furthermore, the predicted sample blending unit 243A can have the same configuration as the predicted sample blending unit 243A of the blending unit 243 illustrated in FIG. 13.

The effects expected from the above configuration are the same as those of the configuration 2.

Which one of the configurations 1 to 4 is selected may be selected according to an intention of a designer based on a trade-off between the coding performance or the decoding processing amount in the image decoding device 100 and the restriction on the memory bandwidth.

Further, the image encoding device 100 and the image decoding device 200 may be realized as a program causing a computer to execute each function (each step).

Note that the above described embodiments have been described by taking application of the present invention to the point cloud encoding device 10 and the point cloud decoding device 30 as examples. However, the present invention is not limited only thereto, but can be similarly applied to an encoding/decoding system having functions of the encoding device 10 and the decoding device 30.

According to the present embodiment, it is possible to improve the overall quality of service in video communications, thereby contributing to Goal 9 of the UN-led Sustainable Development Goals (SDGs) which is to "build resilient infrastructure, promote inclusive and sustainable industrialization and foster innovation".

What is claimed is:

1. An image decoding device comprising:

a circuit, wherein the circuit is configured to:

apply a geometric partitioning mode in which a block to be decoded is partitioned diagonally into partitioned areas, and inter prediction or intra prediction is applied to each of the diagonally partitioned areas;

determine whether to apply overlapped block motion compensation to each of a plurality of sub-blocks each facing a block boundary of the block to be decoded, the plurality of sub-blocks including a sub-block entirely located in a first one of the diagonally partitioned areas, a sub-block entirely located in a second one of the diagonally partitioned areas, and a sub-block overlapping two of the diagonally partitioned areas; and for each sub-block for which it is determined that the overlapped block motion compensation is to be applied, apply the overlapped block motion compensation after the geometric partitioning mode including inter prediction or intra prediction is applied to the block to be decoded.

2. The image decoding device according to claim 1, wherein the sub-block sub-blocks are sub-blocks of a block generated after weighted averaging in the geometric partitioning mode.

3. The image decoding device according to claim 1, wherein the circuit is configured to control whether or not to apply the overlapped block motion compensation to each of the plurality of sub-blocks based on a prediction type of the sub-block.

4. The image decoding device according to claim 3, wherein the circuit is further configured to:

determine to apply the overlapped block motion compensation to the sub-block whose prediction type is the inter prediction;

determine not to apply the overlapped block motion compensation to the sub-block whose prediction type is the intra prediction; and generate a final predicted sample of the block to be decoded based on the determination result.

5. The image decoding device according to claim 1, wherein the circuit is further configured to:

apply the overlapped block motion compensation to a sub-block of which a prediction type is the inter prediction among sub-blocks facing the block boundary of the block to be decoded to which the geometric partitioning mode including the inter prediction or intra prediction is applied;

not apply the overlapped block motion compensation to a sub-block of which the prediction type is the intra prediction among the sub-blocks facing the block boundary; and generate a final predicted sample of the block to be decoded by performing weighted averaging on a motion compensation sample to which the overlapped block motion compensation has been applied and an intra predicted sample to which the overlapped block motion compensation has not been applied.

6. The image decoding device according to claim 1, wherein the circuit executes:

a first process that generates motion compensation samples configuring the block to be decoded to which the geometric partitioning mode including inter prediction or intra prediction is applied; and a second process that generates intra predicted samples configuring the block to be decoded and outputs the intra predicted samples, and wherein the first process:

blends predicted samples of the block to be decoded by performing weighted averaging on the generated motion compensation samples or the intra predicted samples output from the second process; and applies the overlapped block motion compensation to the sub-block facing the block boundary of the block to be decoded.

7. The image decoding device according to claim 6, wherein the first process controls whether to apply the overlapped block motion compensation to the sub-block based on a prediction type of the sub-block.

8. The image decoding device according to claim 7, wherein the first process:

determines to apply the overlapped block motion compensation to the sub-block whose prediction type is the inter prediction;

determines not to apply the overlapped block motion compensation to the sub-block whose prediction type is the intra prediction; and generates a final predicted sample of the block to be decoded based on the determination result.

9. The image decoding device according to claim 1, wherein the circuit executes:

a first process that generates motion compensation samples configuring the block to be decoded to which the geometric partitioning mode including inter prediction or intra prediction is applied; and a second process that generates intra predicted samples configuring the block to be decoded and outputs the intra predicted samples, wherein the first process:

determines whether to apply the overlapped block motion compensation to the sub-block facing the block boundary of the block to be decoded; and blends predicted samples of the block to be decoded by performing weighted averaging on the intra predicted samples output from the second process with respect to the motion compensation samples.

10. The image decoding device according to claim 1, wherein the sub-blocks are sub-blocks of a block generated before weighted averaging in the geometric partitioning mode.

11. The image decoding device according to claim 1, wherein the the plurality of sub-blocks include sub-blocks facing a plurality of block boundaries of the block to be decoded.

12. The image decoding device according to claim 1, wherein the the plurality of sub-blocks include sub-blocks facing two adjacent block boundaries of the block to be decoded.

13. An image decoding method, comprising applying a geometric partitioning mode in which a block to be decoded is partitioned diagonally into partitioned areas, and inter prediction or intra prediction is applied to each of the diagonally partitioned areas;

determining whether to apply overlapped block motion compensation to each of a plurality of sub-blocks each facing a block boundary of the block to be decoded, the plurality of sub-blocks including a sub-block entirely located in a first one of the diagonally partitioned areas, a sub-block entirely located in a second one of the diagonally partitioned areas, and a sub-block overlapping two of the diagonally partitioned areas; and for each sub-block for which it is determined that the overlapped block motion compensation is to be applied, applying the overlapped block motion compensation after the geometric partitioning mode including inter prediction or intra prediction is applied to the block to be decoded.

14. The image decoding method according to claim 13, wherein the plurality of sub-blocks include sub-blocks facing a plurality of block boundaries of the block to be decoded.

15. The image decoding method according to claim 13, wherein the plurality of sub-blocks include sub-blocks facing two adjacent block boundaries of the block to be decoded.

16. A program stored on a non-transitory computer-readable medium for causing a computer to perform functions comprising:

applying a geometric partitioning mode in which a block to be decoded is partitioned diagonally into partitioned areas, and inter prediction or intra prediction is applied to each of the diagonally partitioned areas;

determining whether to apply overlapped block motion compensation to each of a plurality of sub-blocks each facing a block boundary of the block to be decoded, the plurality of sub-blocks including a sub-block entirely located in a first one of the diagonally partitioned areas, a sub-block entirely located in a second one of the diagonally partitioned areas, and a sub-block overlapping two of the diagonally partitioned areas; and for each sub-block for which it is determined that the overlapped block motion compensation is to be applied, applying the overlapped block motion compensation after the geometric partitioning mode including inter prediction or intra prediction is applied to the block to be decoded.

* * * * *